United States Patent [19]

Kawarada et al.

[11] 3,984,586

[45] Oct. 5, 1976

[54] METHOD OF MAKING A MANGANESE-ACTIVATED ZINC SULPHIDE ELECTROLUMINESCENT POWDER

[75] Inventors: Hiroshi Kawarada; Nobumasa Ohshima, both of Hirakata, Japan

[73] Assignee: Matsushita Electric Industrial Co., Ltd., Japan

[22] Filed: July 26, 1974

[21] Appl. No.: 492,327

[30] Foreign Application Priority Data

July 31, 1973   Japan................................ 48-86672

[52] U.S. Cl.................................. 427/64; 427/57;
                                         427/66; 252/301.6 S
[51] Int. Cl.².......................................... C09K 11/16
[58] Field of Search ............. 252/301.6 S; 117/201;
                                         427/64, 66

[56] References Cited

UNITED STATES PATENTS

| | | | |
|---|---|---|---|
| 3,140,999 | 7/1964 | Lehmann...................... | 252/301.6 S |
| 3,178,611 | 4/1965 | Vogel.......................... | 252/301.6 S X |
| 3,704,232 | 11/1972 | Frey et al. ................... | 252/301.6 S |
| 3,775,173 | 11/1973 | Yamamoto et al. ....... | 252/301.6 S X |

*Primary Examiner*—Jack Cooper
*Attorney, Agent, or Firm*—Wenderoth, Lind & Ponack

[57] ABSTRACT

A method of making a manganese-activated zinc sulphide electroluminescent powder for D.C. excitation which contributes to a high electroluminescent brightness, high breakdown voltage and high uniformity and fineness of luminosity of the luminous area in an electroluminescent panel. The feature of this method is to fire a mixture of raw zinc sulphide powder and a manganese compound in an atmosphere of carbon disulphide with a carrier gas.

4 Claims, 1 Drawing Figure

U.S. Patent Oct. 5, 1976 3,984,586
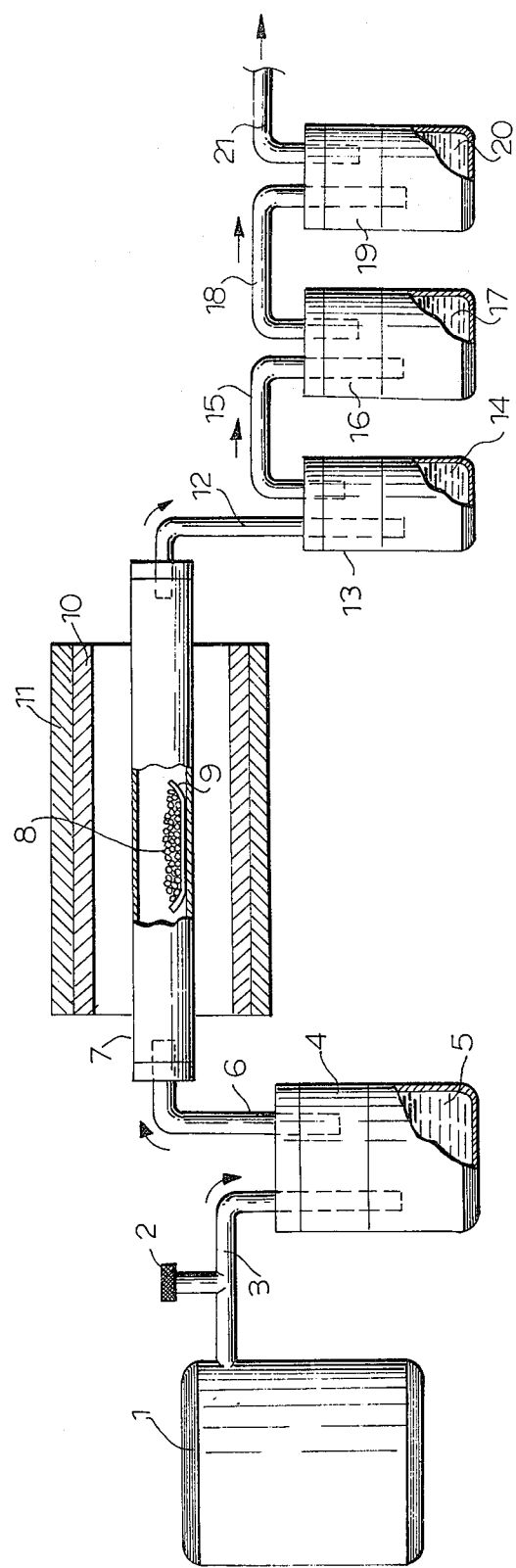

METHOD OF MAKING A MANGANESE-ACTIVATED ZINC SULPHIDE ELECTROLUMINESCENT POWDER

This invention relates to a method of making a manganese-activated zinc sulphide electroluminescent powder (phosphor) for D.C. excitation.

Various methods are known for making an electroluminescent powder for D.C. excitation. One method is such that a mixture of a raw zinc sulphide powder and a manganese compound is fired at a temperature e.g. of 850° to 1050°C in nitrogen gas for an appropriated time e.g. for 1 to 2 hours. For obtaining a powder phosphor having a p-type thin layer coated thereon, the fired mixture is further immersed in an aqueous solution containing copper ions, and is washed in deionized water and dried. In use as an electroluminescent panel, the thus obtained powder phosphor is usually mixed with an inorganic and/or an organic binders having little light-absorbing property so as to obtain a phosphor paint, and the thus made phosphor paint is applied between two electrode plates, at least one of which is transparent, and is then hardened e.g. by heating. The thus made article is an electroluminescent panel for D.C. excitation. In such case, the properties which the electroluminescent powders are required to have are high electroluminescent brightness, high breakdown voltage, etc. It is also desired that the luminous area is of quality, i.e. there are high uniformity and fineness of luminosity of the luminous area in the electroluminescent panel. However, the conventional methods have not contributed to making these required and desired properties sufficient. The electroluminescent powder made in the above-mentioned manner mainly shows a crystalline phase of hexagonal i.e. it has a mainly hexagonal crystalline structure. This is a main cause that there is less uniformity and less fineness of luminosity of the luminous area in the electroluminescent panel.

Accordingly, it is an object of this invention to provide a method of making a manganese-activated zinc sulphide electroluminescent powder in which the required and desired properties as above described are sufficient.

This object is achieved according to this invention to use carbon disulphide with a carrier gas in firing the mixture of a raw zinc sulphide and a manganese compound. The thus obtained electroluminescent powder has a mainly cubic crystalline structure and relatively small particle size that are advantageous for the object of this invention.

This invention will be more readily understood in view of the following detailed description with the accompanying drawing, in which:

The single FIGURE is a schematic drawing showing a manner of firing a mixture of raw ZnS and Mn compound in a mixed atmosphere of carbon disulphide and a carrier gas.

According to this invention, a raw zinc sulphide powder is mixed with a manganese compound. The raw zinc sulphide powder is a powder which is usually and commercially available. It is usually made by chemical reaction. The usual raw zinc sulphide powder has a particle size of 0.01 to 0.1 $\mu$m by electronmicroscopic measurement. Manganese acts as an activator for activating the zinc sulphide. Various materials such as $MnCl_2$, $Mn(NO_3)_2$ and $MnSO_4$ can be used for the manganese compound. Preferable amount of manganese in the manganese compound on the basis of the weight of the raw zinc sulphide powder is 0.05 to 1.5 weight percent, more preferably 0.1 to 0.5 weight percent, wherein the lower limit depends on the minimum required electroluminescent brightness, and the upper limit depends on the maximum acceptable particle size of the resultant electroluminescent zinc sulphide powder. In addition, if the amount of the manganese is too large, the electroluminescent brightness becomes undesiredly low. The raw zinc sulphide powder can be mixed with the manganese compound uniformly by any suitable and available method. For example, such uniform mixing can be carried out by means of ball-milling using a dispersing liquid such as deionized water, methanol and ethanol. Preferable time for ball-milling in this case is several hours to about 20 hours. This preferable ball-milling time depends on the amount and the kind of the raw zinc sulphide powder. In using such mixing methods, the thus made uniform mixture should be dried at a temperature of about 120°C and crushed.

The mixture (powder) of the raw zinc sulphide powder and the manganese compound is fired in an atmosphere of carbon disulphide ($CS_2$) with a carrier gas. Preferable carrier gases are of nitrogen and argon. For the firing, an electric furnace is usually used. The mixture to be fired is put in the electric furnace, and carbon disulphide is introduced into the electric furnace with the aid of the carrier gas. In putting the mixture powder in the electric furnace, a firing container such as a quartz boat with an opening is used to have the mixture powder charged therein. Thus, the mixture powder can be exposed uniformly to the firing atmosphere. In introducing carbon disulphide into the electric furnace with the aid of the carrier gas, usually a carrier gas is introduced into a carbon disulphide solution, which is bubbled thereby, and then the thus made mixed gas is introduced into the electric furnace. The amount of the carbon disulphide per unit time period to be introduced into the electric furnace can be controlled by changing the flowing amount of the carrier gas. Preferable flowing amount of the mixed gas depends on the amount of the mixture powder, the firing temperature, the volume of the electric furnace, etc. In handling carbon disulphide, it is necessary to take care thereof because it is inflammable and toxic. Further, in order to dispose of the exhausted mixed gas from the electric furnace, a well-known cascaded absorption method using a sodium hydroxide solution can advantageously be used.

The accompanying FIGURE schematically shows one example of a manner of firing the raw zinc sulphide powder in a mixed atmosphere of carbon disulphide and a carrier gas. Referring to the FIGURE, reference numeral 1 designates a carrier gas reservoir in which a carrier gas of high pressure is contained. The carrier gas is introduced into a carbon disulphide solution 5 in a container 4 through a valve 2 and a duct 3. A mixed gas of carbon disulphide and the carrier gas is introduced into a furnace tube 7 through a duct 6. In the furnace tube 7, a mixture 8 of raw ZnS and Mn compound in a quartz boat 9 is put. Reference numeral 11 represents a wall of an electric furnace on which an electric heater 10 is provided. To the electric heater, an A.C. powder supply (not shown) is applied. An exhausted gas is disposed through a duct 12 and a cascaded absorption means 13, 14, 15, 16, 17, 18, 19 and 20. Reference numerals 13, 16 and 19 designate containers, reference numerals 14, 17 and 20 are sodium hydroxide solutions, and reference numerals 15 and 18 designate ducts. Reference numeral 21 also designates a duct through which the exhausted gas is disposed to outside.

Preferable firing temperature is 500° to 1000°C, more preferably 600° to 900°C. If the firing temperature is too high, the resultant zinc sulphide powder has undesiredly large particle size, and suffers undesired contamination by carbon, while if the firing temperature is too low, the zinc sulphide powder cannot be well activated by the activator. The firing time can be short or long, and is not very critical. It can be half an hour and can also be several hours.

One of the features of the method of this invention is that the firing temperature can be low, e.g. 500°C, with an ordinary firing time. And still excellent electroluminescent characteristics can be obtained. For example, high electroluminescent brightness and high breakdown voltage can be obtained. Further, the mean particle size of the resultant zinc sulphide powder can be small such as 0.1 to 1.1 $\mu$m, more usually 0.2 to 0.8 $\mu$m. This particle size is smaller than that obtained conventionally such as 0.5 to 1.5 $\mu$m. Another feature of the method of this invention is that a longer firing time period is not required for obtaining well activated zinc sulphide powder in comparison with conventional methods. Conventionally, in firing a mixture powder of a raw zinc sulphide and a manganese compound in e.g. a nitrogen gas at a relatively low temperature such as 800°C, at least 2 hours have been required for the firing. For example, according to the method of this invention using carbon disulphide, only e.g. half an hour is sufficient for the firing so as to obtain excellent electroluminescent characteristics.

After the firing step, the fired mixture powder (manganese-activated zinc sulphide powder) is preferably dispersed in deionized water to break possible aggregation between the powder particles by using e.g. ultrasonic vibration and is washed thereby. The activated powder becomes a sediment by the dispersion step. Further, the sediment of the activated powder is preferably subjected to a repeated dispersion step in a new deionized water in order to prevent the inclusion of unnecessary elements in the activated powder which elements might have got into the activated powder during the firing step. After drying the thus treated activated powder, a refined activated powder is obtained.

An X-ray analysis of the thus made Mn-activated zinc sulphide powder indicates that the main crystalline phase thereof is cubic. That is, the powder is more than 50 percent cubic. The reason why the crystalline phase is mainly cubic rather than hexagonal is because the particles are prevented by the method of this invention from growing into hexagonal structure. This growth prevention contributes to the fine particle size of the resultant Mn-activated zinc sulphide powder.

In making an electroluminescent panel using the manganese-activated zinc sulphide powder made by the method of this invention, any available and suitable techniques can be used. For example, the manganese-activated zinc sulphide powder is mixed with an inorganic and/or an organic binders having little light-absorbing property so as to obtain a phosphor paint, and the thus made phosphor paint is applied between two electrode plates, at least one of which is transparent, and is then hardened e.g. by heating. Since the manganese-activated zinc sulphide powder obtained by the method of this invention has considerably fine particle size, the powder can be well dispersed in the binders, and a large amount of the powder can be mixed uniformly with the binders. Thus, not only the strength of light emission (electroluminescent brightness) and breakdown voltage but also uniformity and fineness of luminosity of the luminous area in the electroluminescent panel can be increased thereby.

The following example is meant to illustrate preferred embodiments of this invention, but not meant to limit all the scope thereof.

EXAMPLE 30 grams of high purity zinc sulphide powder (commercially available) and 0.2 grams of manganese chloride (guaranteed reagent) were intimately mixed with 50 c.c. of deionized water by ball-milling using agate for four hours in a polyethylene container to obtain a slurry mixture. The thus obtained slurry mixture was dried at 120°C and was then pulverized in a mortar so as to obtain a mixture powder. The thus obtained mixture powder was fired in a mixed atmosphere of flowing nitrogen of 50 c.c per minute with carbon disulphide in a manner as schematically shown in the single FIGURE at a temperature of 800°C for 1 hour by using a quartz boat. The thus fired mixture powder was cooled to room temperature. Thus, a manganese-activated zinc sulphide powder was obtained. The thus obtained manganese-activated zinc sulphide powder was dispersed and washed in deionized water vibrating supersonically by using a supersonic vibrator. The thus treated manganese-activated zinc sulphide powder showed a slightly yellowish white color. By means of X-ray analysis and an electromicroscopic photograph, it was found that the manganese-activated zinc sulphide powder had mainly cubic structure (93 percent cubic) and mean particle size of 0.6 $\mu$m. This manganese-activated zinc sulphide powder emitted an orange fluorescent light under ultraviolet excitation of 3650 angstroms.

Thereafter, this manganese-activated zinc sulphide powder was treated by a per se well known manner as follows. 10 grams of the zinc sulphide powder was immersed in an aqueous solution of cuprous chloride including hydrochloric acid at a temperature of 60°C for five minutes which solution contained 1.2 weight percent of copper ions on the basis of the weight of the manganese-activated zinc sulphide powder. Thereby, the surface of the particles of the manganese-activated zinc sulphide powder was covered with a conductive copper sulphide layer. The thus treated powder was washed in deionized water and dried. The volume density (grams/c.c.:under a compressed condition of of 60 kg per square centimeter) of the powder was low (1.70 g/c.c.). It was found that the volume density thereof was about two thirds of that made by a conventional method not employing carbon disulphide. Next, for fabricating an electroluminescent panel, the manganese-activated zinc sulphide powder was mixed with a resin binder (urea resin) in a weight ratio of powder:binder=2:1. Owing to the fine particle size and the low volume density of the manganese-activated zinc sulphide powder, a large amount thereof could be uniformly dispersed in the resin binder, and a paint was obtained thereby which was very suitable for printing. The paint was applied, by using a silk-screen method, to a transparent tin oxide electrode coated on a glass substrate, and was hardened by heating at a temperature of 160°C for one hour. Thus, an electroluminescent layer of 30 μm was formed on the tin oxide electrode. The surface of the electroluminescent layer was very smooth and very much more smooth than that obtained by a conventional method not employing carbon disulphide. On the electroluminescent layer, an aluminum electrode was applied by vacuum-evaporating aluminum. Thus, an electroluminescent panel was obtained. The thus made electroluminescent panel was subjected to a well known so-called forming which is to apply an appropriate D.C. voltage thereto for an appropriate time. The electroluminescent panel was then subjected to measurements of electroluminescent characteristics as follows. A unidirectional pulsed voltage of 60 Hz in frequency and 120 μsec in pulse width was applied to the electroluminescent panel for exciting it. The light output (electroluminescent brightness) then measured was 56 (arbitrary unit) and about two times higher than that of an electroluminescent panel made by a conventional method not using carbon disulphide.

Luminous efficiency was also good. Further, the quality of luminous area i.e. the uniformity and fineness of the luminosity of the luminous area of the electroluminescent panel then observed were much improved than those as conventionally obtained without using carbon disulphide. Additionally, the breakdown voltage of the electroluminescent panel was measured by applying a unidirectional pulsed voltage of 60 Hz in frequency and 120 μsec in pulse width. It was found that the breakdown voltage of the electroluminescent panel of this invention was high (1.17 V/cm), and was higher by about thirty percent than that as conventionally made without using carbon disulphide.

By changing various factors in the method of this invention, various other samples were also made as shown in Table 1. In connection with breakdown voltage, it should be noted that the breakdown voltage of the electroluminescent panel as obtained conventionally is only about 0.8 to 0.9($\times 10^5$ V/cm).

Table 1

| Sample | Manganese compound | Mixing Mixed amount of manganese (wt % based on ZnS) | Ball-milling time (hrs.) | Firing temperature (°C) | Firing time (hrs.) | Flowing amount of carrier gas for $CS_2$ (cc/min.) | Mn-activated ZnS Powder Percent cubic | Mean particle size (μm) |
|---|---|---|---|---|---|---|---|---|
| 1 | *$MnCl_2$ | 0.3 | 4 | 800 | 1 | 50 ($N_2$) | 93 | 0.6 |
| 2 | $MnCl_2$ | 0.3 | 22 | 400 | 1 | 50 ($N_2$) | 100 | 0.06 |
| 3 | $MnCl_2$ | 0.3 | 22 | 500 | 1 | 50 ($N_2$) | 99 | 0.10 |
| 4 | $MnCl_2$ | 0.3 | 22 | 600 | 1 | 50 ($N_2$) | 96 | 0.2 |
| 5 | $MnCl_2$ | 0.3 | 22 | 700 | 1 | 50 ($N_2$) | 94 | 0.5 |
| 6 | $MnCl_2$ | 0.3 | 22 | 800 | 1 | 50 ($N_2$) | 94 | 0.6 |
| 7 | $MnCl_2$ | 0.3 | 22 | 900 | 1 | 50 ($N_2$) | 92 | 0.8 |
| 8 | $MnCl_2$ | 0.3 | 22 | 1000 | 1 | 50 ($N_2$) | 75 | 1.1 |
| 9 | $MnCl_2$ | 0.3 | 22 | 1100 | 1 | 50 ($N_2$) | 34 | 1.3 |
| 10 | $MnCl_2$ | 0.01 | 4 | 800 | 1 | 40 ($N_2$) | 95 | 0.1 |
| 11 | $MnCl_2$ | 0.05 | 4 | 800 | 1 | 40 ($N_2$) | 94 | 0.2 |
| 12 | $MnCl_2$ | 0.1 | 4 | 800 | 1 | 40 ($N_2$) | 94 | 0.6 |
| 13 | $MnCl_2$ | 0.3 | 4 | 800 | 1 | 40 ($N_2$) | 91 | 0.6 |
| 14 | $MnCl_2$ | 0.5 | 4 | 800 | 1 | 40 ($N_2$) | 85 | 0.6 |
| 15 | $MnCl_2$ | 1.0 | 4 | 800 | 1 | 40 ($N_2$) | 70 | 0.9 |
| 16 | $MnCl_2$ | 1.5 | 4 | 800 | 1 | 40 ($N_2$) | 54 | 0.9 |
| 17 | $MnCl_2$ | 3.0 | 4 | 800 | 1 | 40 ($N_2$) | 26 | 1.0 |
| 18 | $MnCl_2$ | 0.3 | 4 | 800 | 1/6 | 40 ($N_2$) | 97 | 0.5 |
| 19 | $MnCl_2$ | 0.3 | 4 | 800 | 1/2 | 40 ($N_2$) | 95 | 0.6 |
| 20 | $MnCl_2$ | 0.3 | 4 | 800 | 1 | 40 ($N_2$) | 95 | 0.6 |
| 21 | $MnCl_2$ | 0.3 | 4 | 800 | 3 | 40 ($N_2$) | 92 | 0.6 |
| 22 | $MnCl_2$ | 0.3 | 4 | 800 | 6 | 40 ($N_2$) | 90 | 0.6 |
| 23 | $MnCl_2$ | 0.3 | 4 | 800 | 1 | 100 ($N_2$) | 94 | 0.6 |
| 24 | $MnCl_2$ | 0.3 | 4 | 800 | 1 | 50 (Ar) | 92 | 0.6 |
| 25 | $Mn(NO_3)_2$ | 0.3 | 4 | 800 | 1 | 50 ($N_2$) | 94 | 0.5 |
| 26 | $MnSO_4$ | 0.3 | 4 | 800 | 1 | 50 ($N_2$) | 91 | 0.7 |
| 27 | $MnCl_2$ | 0.3 | 0.5 | 800 | 1 | 50 ($N_2$) | 93 | 0.6 |
| 28 | $MnCl_2$ | 0.3 | 1 | 800 | 1 | 50 ($N_2$) | 92 | 0.6 |
| 29 | $MnCl_2$ | 0.3 | 10 | 800 | 1 | 50 ($N_2$) | 92 | 0.6 |
| 30 | $MnCl_2$ | 0.3 | 4 | 800 | 1 | 50 ($N_2$) | 91 | 0.6 |
| 31 | $MnCl_2$ | 0.3 | 4 | 800 | 1 | 50 ($N_2$) | 92 | 0.6 |

| Sample | Compressed volume density (g/cc) | Cu aqueous solution | Copper Coating Amount of Cu (wt % based on ZnS) | Coating temp (°C) | Coating time (min.) | Electroluminescent brightness (arb. units) | Luminous efficiency (arb. units) | Breakdown voltage ($10^5$v/cm) | Quality of luminous area |
|---|---|---|---|---|---|---|---|---|---|
| 1 | 1.70 | CuCl (+HCl) | 1.2 | 60 | 5 | 56 | 0.55 | 1.17 | excellent |
| 2 | 1.65 | Cu ($CH_3COO$)$_2$ | 1.5 | 60 | 180 | 0.1 | 0.001 | 1.17 | bad |
| 3 | 1.70 | Cu ($CH_3COO$)$_2$ | 1.5 | 60 | 120 | 10 | 0.19 | 1.17 | good |
| 4 | 1.70 | Cu ($CH_3COO$)$_2$ | 1.5 | 60 | 35 | 32 | 0.45 | 1.17 | excellent |
| 5 | 1.72 | Cu ($CH_3COO$)$_2$ | 1.5 | 60 | 30 | 48 | 0.59 | 1.17 | excellent |
| 6 | 1.75 | Cu ($CH_3COO$)$_2$ | 1.5 | 60 | 30 | 60 | 0.75 | 1.17 | excellent |
| 7 | 1.86 | Cu ($CH_3COO$)$_2$ | 1.5 | 60 | 30 | 32 | 0.56 | 1.17 | excellent |
| 8 | 1.94 | Cu ($CH_3COO$)$_2$ | 1.5 | 60 | 30 | 11 | 0.17 | 1.17 | good |
| 9 | 2.32 | Cu ($CH_3COO$)$_2$ | 1.5 | 60 | 30 | 1 | 0.02 | 0.83 | bad |
| 10 | 1.70 | Cu ($CH_3COO$)$_2$ | 1.5 | 60 | 45 | 7 | 0.07 | 1.17 | good |
| 11 | 1.70 | Cu ($CH_3COO$)$_2$ | 1.5 | 60 | 45 | 35 | 0.23 | 1.17 | excellent |
| 12 | 1.68 | Cu ($CH_3COO$)$_2$ | 1.5 | 60 | 45 | 54 | 0.42 | 1.17 | excellent |
| 13 | 1.70 | Cu ($CH_3COO$)$_2$ | 1.5 | 60 | 40 | 48 | 0.76 | 1.17 | excellent |
| 14 | 1.76 | Cu ($CH_3COO$)$_2$ | 1.5 | 60 | 40 | 42 | 0.31 | 1.17 | excellent |
| 15 | 1.76 | Cu ($CH_3COO$)$_2$ | 1.5 | 60 | 40 | 22 | 0.12 | 1.17 | good |
| 16 | 1.80 | Cu ($CH_3COO$)$_2$ | 1.5 | 60 | 40 | 12 | 0.10 | 1.17 | good |
| 17 | 1.94 | Cu ($CH_3COO$)$_2$ | 1.5 | 60 | 40 | 4 | 0.03 | 1.00 | good |
| 18 | 1.78 | Cu ($CH_3COO$)$_2$ | 1.5 | 60 | 40 | 55 | 0.43 | 1.17 | excellent |
| 19 | 1.78 | Cu ($CH_3COO$)$_2$ | 1.5 | 60 | 40 | 53 | 0.44 | 1.17 | excellent |

Table 1-continued

| | | | | | | | | | |
|---|---|---|---|---|---|---|---|---|---|
| 20 | 1.78 | Cu (CH₃COO)₂ | 1.5 | 60 | 40 | 57 | 0.45 | 1.17 | excellent |
| 21 | 1.81 | Cu (CH₃COO)₂ | 1.5 | 60 | 45 | 57 | 0.48 | 1.17 | excellent |
| 22 | 1.86 | Cu (CH₃COO)₂ | 1.5 | 60 | 45 | 43 | 0.32 | 1.17 | excellent |
| 23 | 1.84 | Cu (CH₃COO)₂ | 1.5 | 60 | 45 | 42 | 0.41 | 1.17 | excellent |
| 24 | 1.75 | CUCl (+HCl) | 1.4 | 60 | 5 | 52 | 0.46 | 1.17 | excellent |
| 25 | 1.68 | Cu (CH₃COO)₂ | 1.5 | 60 | 45 | 45 | 0.35 | 1.17 | excellent |
| 26 | 1.70 | Cu (CH₃COO)₂ | 1.5 | 60 | 45 | 40 | 0.32 | 1.17 | excellent |
| 27 | 1.70 | Cu (CH₃COO)₂ | 1.5 | 60 | 30 | 50 | 0.31 | 1.17 | excellent |
| 28 | 1.74 | Cu (CH₃COO)₂ | 1.5 | 60 | 30 | 50 | 0.40 | 1.17 | excellent |
| 29 | 1.76 | Cu (CH₃COO)₂ | 1.5 | 60 | 30 | 58 | 0.44 | 1.17 | excellent |
| 30 | 1.78 | Cu (CH₃COO)₂ | 1.5 | 55 | 150 | 35 | 0.37 | 1.17 | excellent |
| 31 | 1.78 | Cu (CH₃COO)₂ | 1.5 | 75 | 10 | 42 | 0.31 | 1.17 | excellent |

*Described in detail in Example

What is claimed is:

1. A method of making a manganese-activated zinc sulphide electroluminescent powder for D.C. excitation having a mainly cubic crystalline structure, which method comprises: preparing a mixture consisting essentially of a zinc sulphide powder and a manganese compound selected from the group consisting of MnCl₂, Mn(NO₃)₂ and MnSO₄, the amount of manganese in said manganese compound being from 0.05 to 1.5 weight percent on the basis of the weight of said zinc sulphide powder; and firing said mixture in an atmosphere of carbon disulphide and nitrogen or argon, as a carrier gas for said carbon disulphide, at a temperature of from 600° to 900°C.

2. A method according to claim 1, wherein the amount of said manganese in said manganese compound is from 0.1 to 0.5 weight percent on the basis of the weight of said zinc sulphide powder.

3. A method according to claim 1, wherein the fired mixture is further dispersed and washed in deionized water by ultrasonic vibration.

4. A method according to claim 3, wherein the dispersed and washed mixture is further immersed in an aqueous solution containing copper ions, and is again washed in deionized water and dried.

* * * * *